United States Patent
Maliszewski

(10) Patent No.: US 7,073,200 B2
(45) Date of Patent: Jul. 4, 2006

(54) METHOD OF PROVIDING SECURE CONTENT-BASED USER EXPERIENCE ENHANCEMENT WITHIN A CONTENT PROTECTION ARCHITECTURE

(75) Inventor: Richard L. Maliszewski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 09/769,155

(22) Filed: Jan. 24, 2001

(65) Prior Publication Data

US 2002/0097872 A1    Jul. 25, 2002

(51) Int. Cl.
*G06F 11/30* (2006.01)
*G06F 12/00* (2006.01)

(52) U.S. Cl. ............... 726/26; 726/27; 726/17
(58) Field of Classification Search ................ 726/329, 726/27, 26, 16–17, 30, 32; 713/100, 201, 713/202, 200
See application file for complete search history.

(56) References Cited

U.S. PATENT DOCUMENTS

| | | | | |
|---|---|---|---|---|
| 6,052,717 A * | 4/2000 | Reynolds et al. | ............ | 709/218 |
| 6,125,147 A * | 9/2000 | Florencio et al. | ...... | 375/240.29 |
| 6,185,681 B1 * | 2/2001 | Zizzi | ........................ | 713/165 |
| 6,314,190 B1 * | 11/2001 | Zimmermann | ............... | 380/282 |
| 6,405,203 B1 * | 6/2002 | Collart | ......................... | 707/10 |
| 6,570,990 B1 * | 5/2003 | Kohn et al. | .................. | 380/213 |
| 6,662,060 B1 * | 12/2003 | Maliszewski et al. | ......... | 700/94 |
| 6,697,944 B1 * | 2/2004 | Jones et al. | .................. | 713/168 |
| 6,779,115 B1 * | 8/2004 | Naim | .......................... | 713/192 |
| 6,799,302 B1 * | 9/2004 | Sites | ......................... | 715/526 |
| 2002/0076049 A1 * | 6/2002 | Boykin et al. | .............. | 380/211 |
| 2002/0159592 A1 * | 10/2002 | Matsushima et al. | ........ | 380/201 |

* cited by examiner

*Primary Examiner*—Norman M. Wright
(74) *Attorney, Agent, or Firm*—Steven P. Skabrat

(57) ABSTRACT

Providing secure content-based user experience enhancement in a player device for rendering digital content includes accepting encrypted digital content, decrypting the encrypted digital content into decrypted digital content, downsampling the decrypted digital content into downsampled digital content; and processing the downsampled digital content by an enhancement module to provide the user experience enhancement. The system protects content being rendered by a player application even when the content is also sent to an enhancement module such as a plug-in. The original content is protected by only transferring a version of the content to the enhancement module that is downsampled. That is, the original high fidelity, high value content is never transferred to the untrusted enhancement module. Instead, the content is downsampled into a lower fidelity form that it is still useful for the purposes of enhancement module processing, but is not useful or desirable for other purposes (such as normal rendering of the content for enjoyment by the user).

11 Claims, 4 Drawing Sheets

METHOD OF PROVIDING SECURE CONTENT-BASED USER EXPERIENCE ENHANCEMENT WITHIN A CONTENT PROTECTION ARCHITECTURE

BACKGROUND

1. Field

The present invention relates generally to security of content in computer and consumer electronics systems and, more specifically, to providing mechanisms to enhance the user experience when rendering content, without compromising security.

2. Description

Playback devices for rendering digital content frequently offer means for providing an enhanced end-user experience. For example, when a playback device is an audio player application (such as the well known WinAmp audio player commercially available from NullSoft Corp.), the player may include one or more other software modules called "plug-ins" to provide extra value to the user. In one scenario, the plug-in is an audio visualization module that presents a stylized view of a graphic equalizer showing the audio spectrum of the content during rendering. In another example, the plug-in shows a dynamically generated artistic graphical representation of the audio as it is being rendered. In both cases, the enhancement provided to the user uses the actual audio data being rendered as input data to the enhancement feature. Other enhancement features using the content (both audio and video) are known.

In many playback devices and applications, the device or application developer adopts an open software architecture that allows the use of plug-ins. In fact, the device or application developer may even actively promote the development of various plug-ins by independent entities (e.g., students, music enthusiasts, programmers, etc.), each plug-in enhancing the overall user experience, thereby encouraging further deployment of the application developer's player.

During rendering of the content by the player, a compressed or uncompressed content stream is typically forwarded to the enhancement module (e.g., plug-in) concurrently with the content being forwarded to the output devices of the system (such as the audio subsystem, graphics subsystem, audio loudspeakers and/or display). The enhancement module then uses the content stream as input data to produce the desired enhancement (such as extra display information for a graphic equalizer or an artistic representation, for example). Even if the content is distributed to the player application in an encrypted manner, the content is typically decrypted prior to or during rendering and forwarding to the enhancement module. One problem is that the enhancement modules are typically easily replaceable by the user, and could therefore be used as a conduit for misappropriation of the content. A hacker or other unauthorized user could design an enhancement module (plug-in) to save the content during content stream processing, thereby pirating the content. One solution to this problem is to disable the ability of the player application to interact with the enhancement module. However, this is unpopular with the player application developer as well as with the developers of the enhancement modules and users. Similarly, bringing the enhancement module within the content protection perimeter of the player application becomes problematic because the enhancement modules are typically independently designed and distributed by individuals in a "grass roots" manner. Organizing these individuals to support a security scheme to protect the content within the player would be very difficult.

BRIEF DESCRIPTION OF THE DRAWINGS

The features and advantages of the present invention will become apparent from the following detailed description of the present invention in which.

DETAILED DESCRIPTION

An embodiment of the present invention is a method and system for protecting content being rendered by a player application even when the content is also sent to an enhancement module such as a plug-in. In one embodiment, the original content is protected by only transferring a version of the content to the enhancement module that is downsampled. That is, the original high fidelity, high value content is never transferred to the enhancement module. Instead, the content is downsampled into a lower fidelity form that it is still useful for the purposes of enhancement module processing, but is not useful or desirable for other purposes (such as normal rendering of the content for enjoyment by the user). Thus, a hacker or pirate will have no motivation to design an enhancement module that misappropriates the content available to the enhancement module because the only content the enhancement module may access is in a form that is of low fidelity or low quality.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
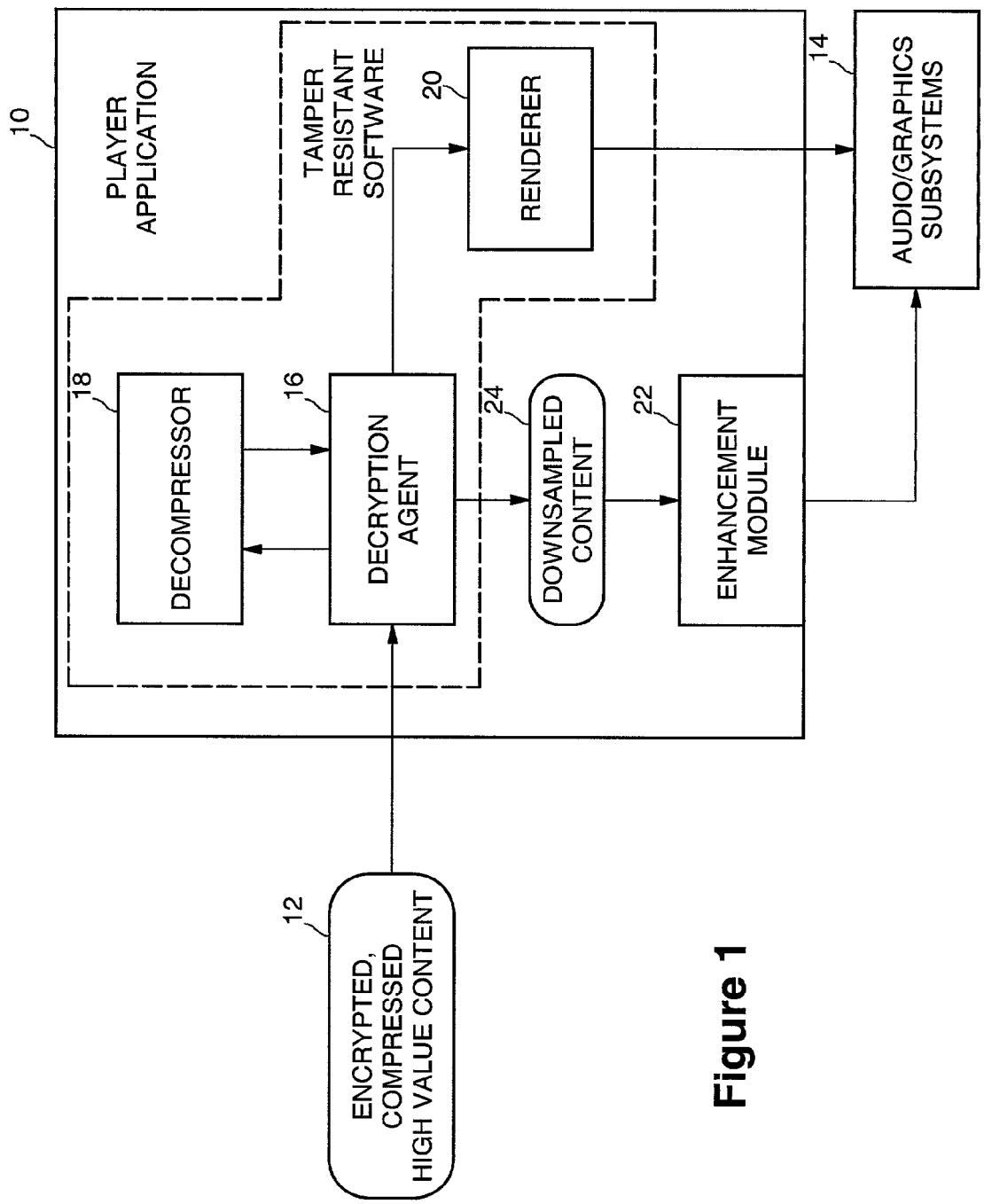
FIG. 1 is a diagram of an architecture of a player application according to an embodiment of the present invention.

FIG. 1 is a diagram of an architecture of a player application according to an embodiment of the present invention. Generally, the player application 10 comprises any software or hardware module that accepts encrypted, compressed high value digital content 12 and renders that content via audio and/or graphics subsystems 14 for perception by a user. In one embodiment, the player application is a software module being executed by a processing system such as a personal computer (PC) and the audio and/or graphics subsystems comprises conventional systems in a PC for rendering audio and video data. In other embodiments, the player application and audio and/or graphics subsystems may be included in a workstation, a handheld computer, an Internet or web tablet, a personal digital assistant (PDA), a cell phone, a personal audio player (such as a portable MP3 player device), a consumer electronics device, a set top box, a digital television, a game console, or any other device capable of rendering digital content. The digital content comprises any combination of audio, video, text, image, or other data. The digital content may be received in any one of a variety of forms, including an encrypted form, compressed form, and an encrypted and compressed form.

In one illustrative embodiment, the player application comprises software modules for receiving digital audio data (e.g., MP3s, WAV files, and the like) and for playing the audio for the user, although the invention is not limited in scope in this respect. Decryption agent 16 accepts the encrypted, compressed high value content via any data transfer mechanism and decrypts the content into a compressed, decrypted form. Decryption agent 16 forwards the compressed, decrypted content to decompressor module 18. The decompressor module (e.g., a codec) decompresses the compressed, decrypted content into a decompressed, decrypted form and passes the content back to the decryption agent. The decryption agent then transfers the decompressed, decrypted content to renderer module 20 for interaction with audio/graphics subsystems 14 to render the content for the user. Any one or more of the decryption agent, the decompressor, and the renderer may comprise tamper resistant code (represented in FIG. 1 as being within the dashed lines). Software may be made tamper resistant through known methods to deter tampering with the software and to deter unauthorized access to content processed by the tamper resistant modules. In various embodiments, one or more of the decryption agent, the decompressor, and the renderer may be combined into a single module within player application 10, rather than being individual, discrete modules.

Enhancement module 22 may comprise a plug-in designed and developed by any entity. In many cases, the enhancement module will be provided by some entity other than the entity that designed, developed, or distributed the player application. For example, company A may distribute the player application, but individual B may provide the enhancement module to add a new feature to the player application that enhances the user's experience in using the player application. Generally, enhancement modules may be used to provide any additional audio or visual feature for the player. For example, the enhancement module may generate in real-time a visual display representing output data of a graphic equalizer based at least in part on the rendered content, or artistic graphical representations of the rendered content. The present invention protects the content being processed by the player application using the aforementioned tamper resistant techniques as well as by limiting the fidelity or quality of the content allowed to be transferred to the enhancement module. In effect, since the enhancement module may be provided by an unknown entity, the player application does not trust the enhancement module to securely handle the high value digital content. Instead, the enhancement module only is allowed to process lower fidelity content to generate such features as real-time visual displays based at least in part on the lower fidelity content.

In one embodiment, decryption agent 16 takes decrypted, uncompressed content and downsamples the content to produce downsampled content 24. There are many known ways of downsampling audio and video data, any of which may be used in the present invention. For example, if the content is audio data at a sample rate of 44 kHZ, the data may be downsampled to a sample rate of 4 kHZ. The downsampled content may still be useful for enhancement module processing, but the downsampled content may not be desirable for listening to by a user. In another embodiment, the decrypted but still compressed content may be downsampled prior to delivery to the enhancement module, and the enhancement module may decompress the decrypted, downsampled content.

Implementing the present invention into an existing player application results in a minimum of modifications to the player application design, yet provides the desired security in protecting the high value content even when user-supplied enhancement modules are employed.

Figure 2:
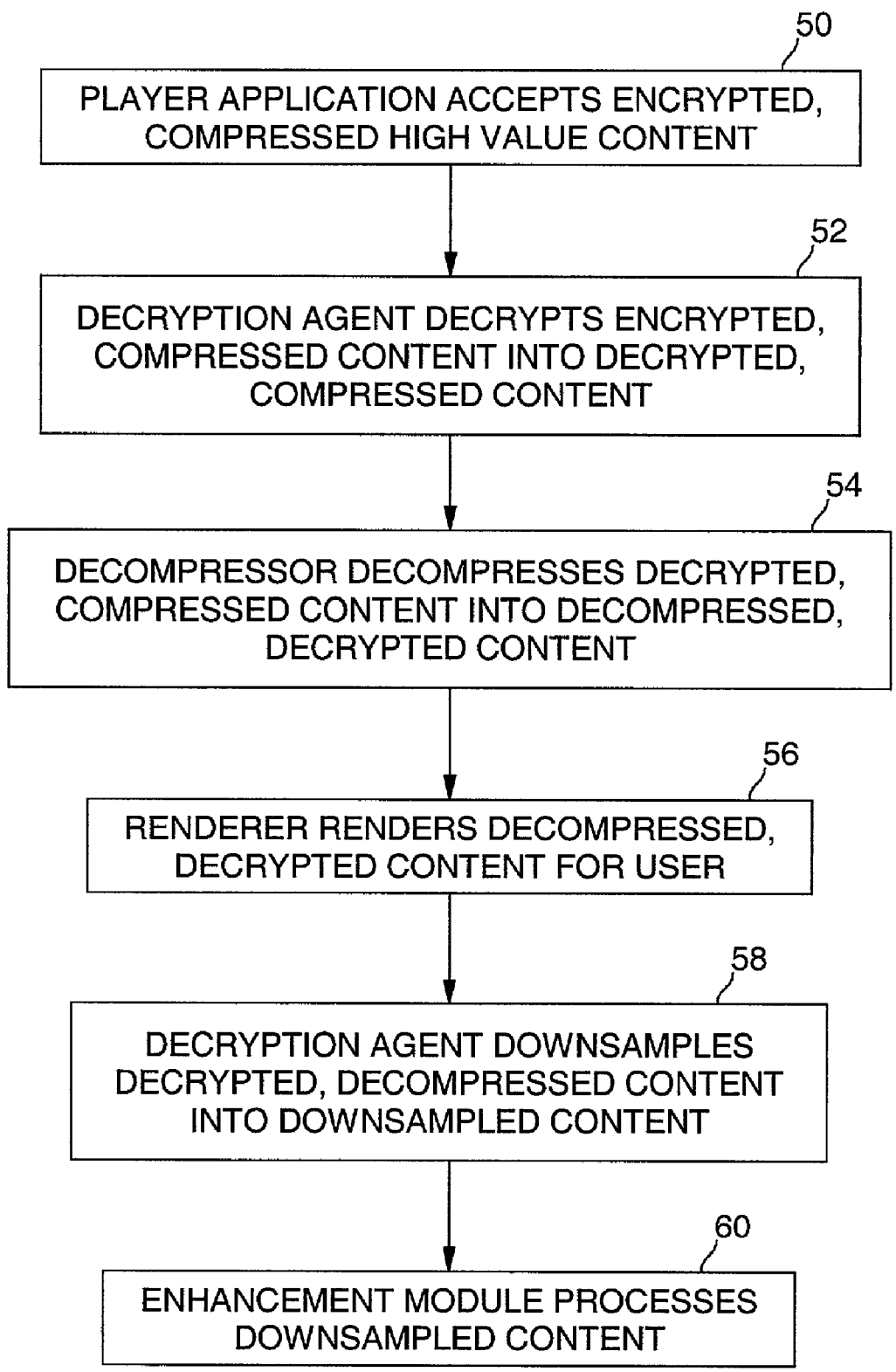
FIG. 2 is a flow diagram illustrating player application processing according to an embodiment of the present invention.

FIG. 2 is a flow diagram illustrating player application processing according to an embodiment of the present invention. At block 50, the player application accepts as input encrypted, compressed high value content to ultimately be rendered for perception by a user. At block 52, the decryption agent decrypts the encrypted, compressed content to produce decrypted, compressed content. At block 54, the decompressor module decompresses the decrypted, compressed content to produce decrypted, decompressed content. At block 56, the renderer module renders the decrypted, decompressed content for the user by interacting with the audio and/or graphics subsystems. Each of blocks 50–56 may be protected from unauthorized interference by protecting the decryption agent, decompressor module, and renderer module through tamper resistant techniques. Concurrently with block 56 or after block 56, at block 58 decryption agent downsamples the decrypted, decompressed content to produce downsampled content. The downsampled content may be transferred to the enhancement module. At block 60, the enhancement module processes the downsampled content to produce a user-perceptible feature that enhances the user's experience in using the player application. This block may be performed in synchronization with block 56.

Figure 3:
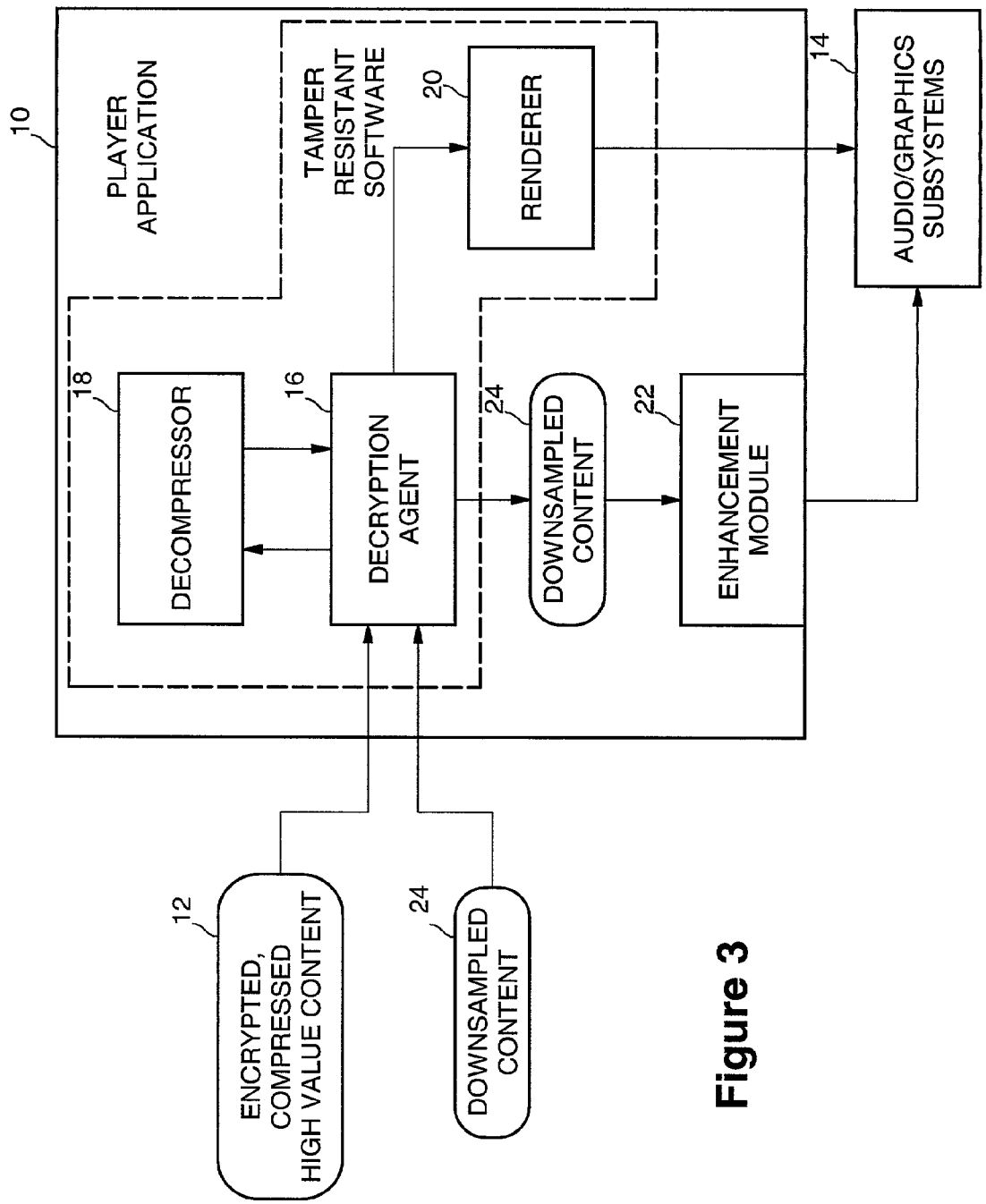
FIG. 3 is a diagram of an alternative embodiment of the present invention.

In another embodiment, the content may be downsampled by the manufacturer or distributor of the content prior to delivery to the player device. FIG. 3 is a diagram of an alternative embodiment of the present invention. In this embodiment, when the content is being mastered, a copy of the original, high fidelity, high value content may be made by the content manufacturer, distributor or developer. The copy may be downsampled according to any downsampling technique. The original, high fidelity, high value content may be compressed and encrypted prior to delivery. The downsampled content may also be compressed for ease of delivery, but there may be no need to encrypt the downsampled content because this copy is low fidelity and low value. In this embodiment, when the content is communicated to the player device, both the original, high fidelity, high value content as well as the downsampled content is transferred. The player application receives the content and processes the encrypted, compressed content in the conventional manner (e.g., by decrypting, decompressing and rendering the content). The player application forwards the downsampled content to the enhancement module for further processing. As in the embodiment of FIG. 1, this embodiment ensures that only downsampled content is made available to the untrusted enhancement module.

Figure 4:
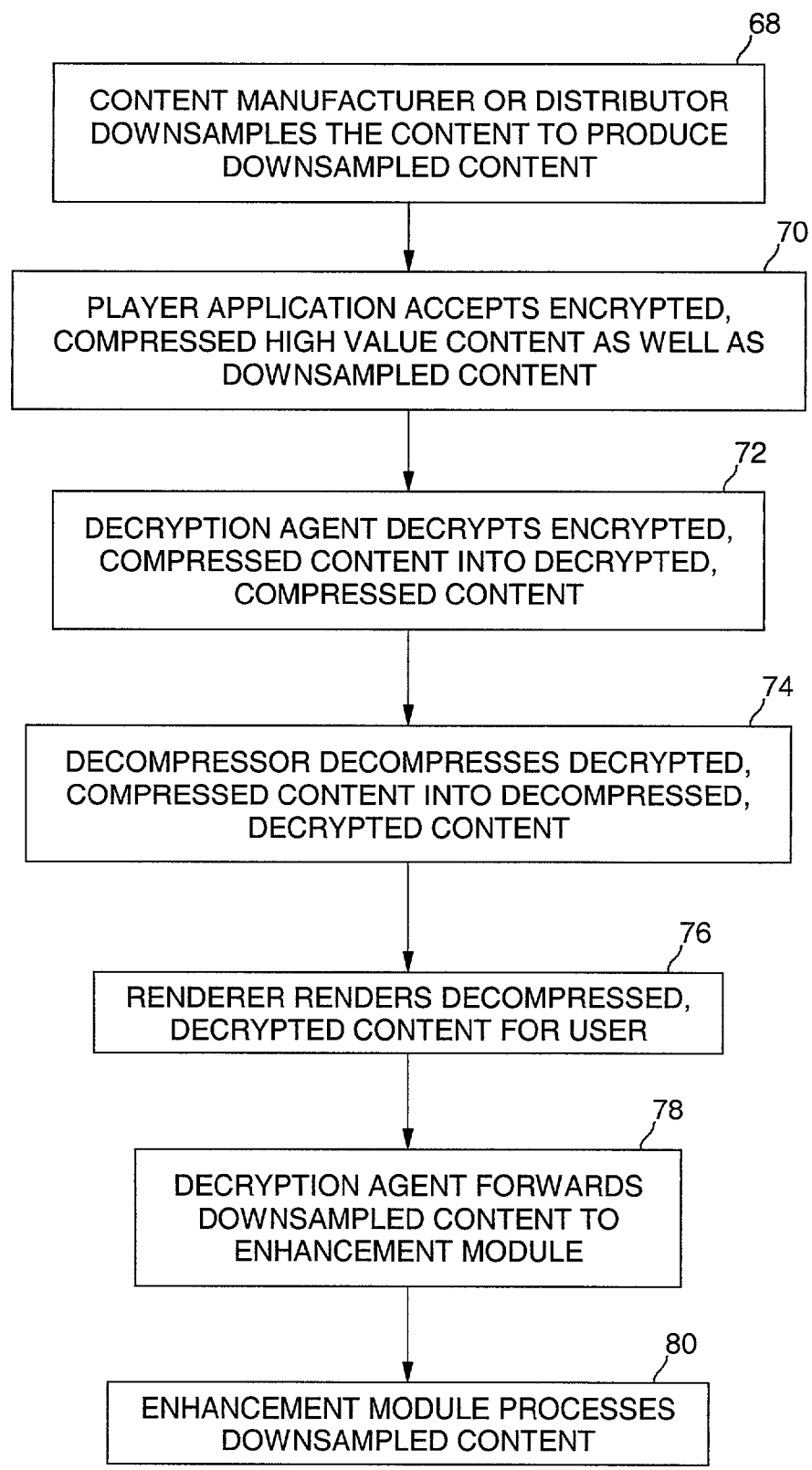
FIG. 4 is a flow diagram illustrating system processing of an alternative embodiment of the present invention.

FIG. 4 is a flow diagram illustrating system processing of an alternative embodiment of the present invention. At block 68, the content manufacturer, distributor or other entity downsamples the original high fidelity, high value content to produce downsampled content. The distributor then transfers, using any mechanism, the content to the player device. At block 70, the player application accepts as input encrypted, compressed high value content to ultimately be rendered for perception by a user, as well as the downsampled content. At block 72, the decryption agent decrypts the encrypted, compressed content to produce decrypted, compressed content. At block 74, the decompressor module decompresses the decrypted, compressed content to produce decrypted, decompressed content. At block 76, the renderer module renders the decrypted, decompressed content for the user by interacting with the audio and/or graphics subsystems. Each of blocks 70–76 may be protected from unauthorized interference by protecting the decryption agent, decompressor module, and renderer module through tamper resistant techniques. Concurrently with or after any of blocks 72–76, at block 78 decryption agent forwards the downsampled content to the enhancement module. At block 80, the enhancement module processes the downsampled content to produce a user-perceptible feature that enhances the user's experience in using the player application. This block may be performed in synchronization with block 76.

Embodiments of the present invention may be applied to many different content delivery scenarios. For example, a film may be distributed in digital form on a digital versatile disk (DVD). The DVD may include both the original, high fidelity, high value content in an encrypted, compressed form, as well as additional audio and video data in downsampled format. The high value content may be protected by encryption techniques so that the user can view this content only after he or she has paid for the privilege of viewing the content and has obtained the security key. However, the downsampled content may be freely available and contain extra material that enhances or augments the user's enjoyment of the high value content. In another example, the downsampled content may be streamed to a player device in real-time. A user may view the downsampled content for free, but may be required to purchase the high value content. In yet another example, a live, interactive multiplayer game may provide a standard game view through the original content. If a user desires to have additional views of the game play (perhaps from different angles or perspectives), the additional information may be handled by downsampling at least a portion of the original content and providing the downsampled content to the enhancement module.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of providing secure content-based user experience enhancement in a player device for rendering digital content comprising:

accepting encrypted first fidelity digital content by a player application module in the player device;

securely decrypting the encrypted first fidelity digital content by the player application module into decrypted first fidelity digital content;

securely and audibly rendering, by the player application module, the decrypted first fidelity digital content for perception by the user;

securely downsampling, by the player application module, the decrypted first fidelity digital content into downsampled digital content having a second fidelity, the second fidelity lower than the first fidelity; and displaying images by a visual enhancement plug-in software module based on the downsampled digital content having the second fidelity in conjunction with the audible rendering of the decrypted first fidelity digital content by the player application module.

2. The method of claim 1, further comprising decompressing the decrypted first fidelity digital content prior to downsampling.

3. The method of claim 1, further comprising protecting the decrypting, rendering, and downsampling actions by using tamper resistance techniques to deter unauthorized access to the decrypted first fidelity digital content.

4. The method of claim 1, wherein the player application module is provided by a first software provider to the user and the visual enhancement plug-in software module is provided by a second software provider to the user, the first software provider being different than the second software provider.

5. The method of claim 1, wherein the digital content comprises digital audio data.

6. The method of claim 1, wherein the digital content comprises digital audio and video data.

7. An article comprising: a storage medium having machine readable instructions stored thereon, the instructions, when executed by a processor, provide for secure content-based user experience enhancement in a player device for rendering digital content by accepting encrypted first fidelity digital content by a player application module in the player device, securely decrypting the encrypted first fidelity digital content by the player application module into decrypted first fidelity digital content, securely and audibly rendering, by the player application module, the decrypted first fidelity digital content for perception by the user, securely downsampling, by the player application module, the decrypted first fidelity digital content into downsampled digital content having a second fidelity, the second fidelity lower than the first fidelity, and displaying images by a visual enhancement plug-in software module based on the downsampled digital content having the second fidelity in conjunction with the audible rendering of the decrypted first fidelity digital content by the player application module.

8. The article of claim 7, further comprising instructions for decompressing the decrypted first fidelity digital content prior to downsampling.

9. A processing system providing secure content-based user experience enhancement in a player device for rendering digital content, comprising:
  a player application module including
    a tamper resistant decryption agent to securely accept encrypted first fidelity digital content, to securely decrypt the encrypted first fidelity digital content into decrypted first fidelity digital content; and to securely downsample the decrypted first fidelity digital content into downsampled digital audio content having a second fidelity, the second fidelity lower than the first fidelity; and
  a tamper-resistant renderer coupled to the decryption agent to securely audibly render the decrypted first fidelity digital content for perception by the user; and
  an visual enhancement plug-in software module coupled to the decryption agent to receive the downsampled digital content having the second fidelity, and to cause the display of images based on the downsampled digital content having the second fidelity in conjunction with the audible rendering of the decrypted first fidelity digital content.

10. The system of claim 9, further comprising a tamper resistant decompressor module to decompress the decrypted first fidelity digital content prior to downsampling.

11. The processing system of claim 9, wherein the player application module is provided by a first software provider to the user and the visual enhancement plug-in software module is provided by a second software provider to the user, the first software provider being different than the second software provider.

* * * * *